(Model.)
E. A. TRIM.
CANTEEN.
No. 382,020. Patented May 1, 1888.
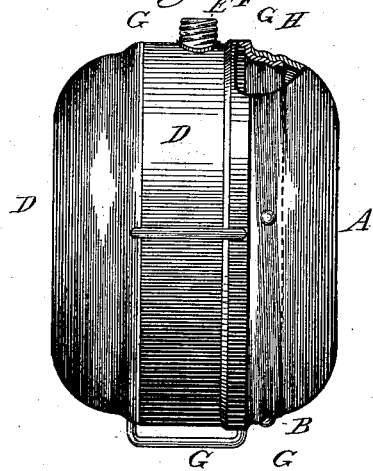
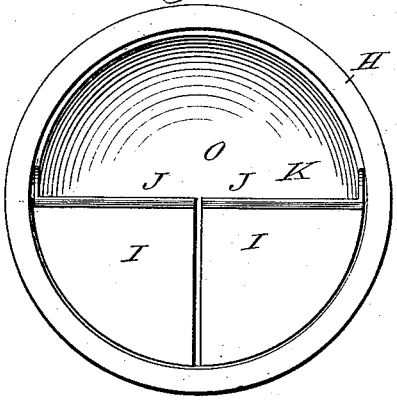
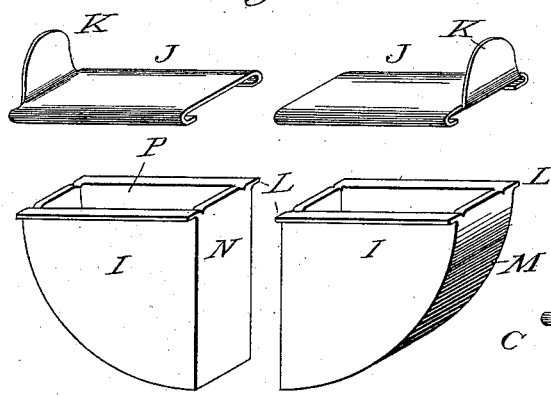
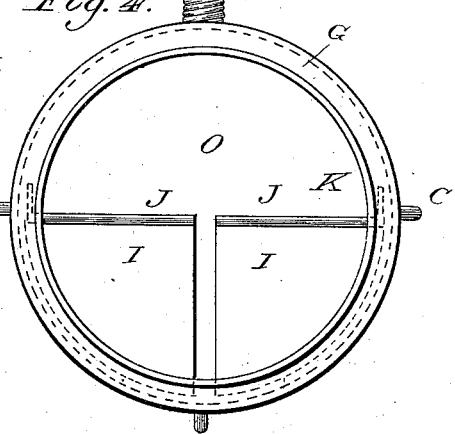
Witnesses:
James E. Jat.
Thomas Edmonds.
Inventor:
Eunice Ann Trim.

UNITED STATES PATENT OFFICE.

EUNICE ANN TRIM, OF MALONE, TERRITORY OF NEW MEXICO.

CANTEEN.

SPECIFICATION forming part of Letters Patent No. 382,020, dated May 1, 1888.

Application filed July 21, 1887. Serial No. 244,959. (Model.)

*To all whom it may concern:*

Be it known that I, EUNICE ANN TRIM, a citizen of the United States, residing at Malone, in the county of Grant and Territory of New Mexico, have invented a new and useful Combination for Canteens, of which the following is a specification.

My invention relates to improvements in canteens, in which is made, in combination, a cavity on the side suitable to admit and convey food, there being cups therewithin removable, with sliding lids, used in conveying such articles of food as would otherwise mix, these cups containing articles of food being firmly bound into said cavity by a lid which screws on over the cavity, thus forming what I call a "combination comfort canteen."

I attain the object of my invention by the mechanism illustrated in the accompanying drawings, in which—

Figure 1 is an edge view of the outside shape. Fig. 2 is a side view showing the victuals-compartment with the accompanying cups in proper position exclusive of the water-compartment. Fig. 3 is a view of the cups and sliding lids which cover them. Fig. 4 is a view of the victuals-compartment with the connecting portion of the water-compartment of the canteen, where the two are made together.

Similar letters refer to similar parts throughout the several views.

Letter A refers to the lid, which screws on over the victuals-compartment H.

Letter B shows the small loops soldered on the lid A to assist in screwing off and on.

Letter C refers to the cord-loops, under which a cord is passed to carry the canteen by.

Letter D refers to the water-compartment.

Letter E refers to the cover-lid, which screws on over the mouth or place where the water is put in and taken out of the canteen.

Letter F refers to the impressed line and dividing-sheet, the impressed line being made for the purpose of affording a suitable shoulder to solder the dividing-sheet onto the inside of the canteen. The dividing-sheet is the separating-sheet, which holds the water and food compartments separate.

Letter G refers to the edges whereon the sides are soldered.

Letter H refers to the entrance of the food-compartment, in which cups I are made to fit the circle of the canteen.

Letter J refers to the sliding lids which cover the cups I.

Letter K refers to the bent-up end of the sliding lids used to catch onto and to slide off from the cups.

Letter Z refers to the outward curve of the top sides of the cups over which the lids slide.

Letter M is an outward edge view of the cups; letter N, the inside edge view of the cups where they fit together when in proper place.

Letter O refers to the vacant space over the cups to be used to carry bread and other dry food.

Letter P refers to the top of the cups.

The lid A, when taken off, serves for a dish to eat on.

I am aware that the several parts of this canteen in regard to the compartment for water have previously been patented.

I do not claim the water-compartment alone as my invention; but

What I claim is—

A canteen having two compartments, one for liquid, the other for solid food, the two compartments being divided by a partition and detachably united together, the solid-food compartment being provided with vessels having sliding covers which conform in shape to the compartment, and the liquid-compartment provided with a nozzle, substantially as described.

EUNICE ANN TRIM.

Witnesses:
W. B. DONOHO,
JOHN B. MALONE.